Patented June 25, 1935

2,005,810

UNITED STATES PATENT OFFICE 2,005,810

DYESTUFFS OF THE DIBENZANTHRONE SERIES AND PROCESS OF PREPARING THE SAME

Otto Stallmann, South Milwaukee, Wis., assignor to E. I. du Pont de Nemours & Company, Wilmington, Del., a corporation of Delaware No Drawing. Application February 27, 1933, Serial No. 658,833

22 Claims. (Cl. 260—54)

This invention relates to novel dyestuffs of the dibenzanthrone series, and deals more particularly with novel compounds obtained from certain mono-alkyl ethers of dihydroxy-dibenzanthrone, as are more fully defined below. The novel products can be used directly as vat dyestuffs, or they may be converted by further treatment into acid wool or silk dyestuffs, or again into dyestuffs suitable for dyeing cellulose-acetate fibers.

It is an object of this invention to obtain, from certain mono-alkyl ethers of dihydroxydibenzanthrone, a novel type of valuable vat dyestuffs, in the preparation of which there is involved only one alkyl residue, and which produce bluish-green dyeings of excellent fastness properties, especially to alkali, acid and light. This is a surprising result in view of the fact that mono-alkyl ethers of dihydroxy-dibenzanthrone as disclosed in literature dye cotton in blue shades and are not fast to alkali and to light, due probably to the presence of a free hydroxy group.

It is a further object of this invention to obtain new valuable vat dyes from certain mono-alkyl ethers of dihydroxy-dibenzanthrone in a simple economic way without employing any further alkylating or arylating agents otherwise necessary for the purpose of etherifying the free hydroxy group.

A still further object of this invention is to obtain novel vat dyes of the Jade Green series, which possess remarkable stability in concentrated sulfuric acid even at elevated temperatures, and can be readily purified by crystrallization from sulfuric acid.

A still further object of this invention is to prepare novel derivatives of dihydroxy-dibenzanthrone which, due to their high stability in concentrated sulfuric acid and nitric acid even at elevated temperatures can be sulfonated, nitrated, chlorinated, oxidized, or otherwise further modified whereby to obtain from these derivatives novel acid dyestuffs for wool and silk or dyestuffs adapted for dyeing cellulose acetate material. It will be observed that heretofore dyestuffs of the Jade Green series were unavailable for the dyeing of wool and silk because the required high alkalinity of the vat is generally detrimental to animal fibers. On the other hand, solubilizing the dyestuffs by sulfonation results in hydrolysis of the ether groups, which changes the shade of the dyestuff and tends to destroy its fastness properties.

Other and further important objects of this invention will appear as the description proceeds.

In U. S. application Serial No. 549,092, filed July 6, 1931, by Edward T. Howell and myself as joint inventors, there is disclosed the preparation of the mono-isopropyl ether of dihydroxy-dibenzanthrone by the action of isopropyl-bromide on the soda salt of dihydroxy-dibenzanthrone or by reacting under mild conditions (comparatively low temperature) with p-toluene-sulfo-isopropyl ester on the soda salt of dihydroxy-dibenzanthrone in dichlorobenzene suspension.

In an analogous manner the mono-isobutyl ether of dihydroxy-dibenzanthrone may be prepared.

I have now found that when a mono-isoalkyl ether of dihydroxy-dibenzanthrone, for instance, the mono-isopropyl or mono-isobutyl ether above mentioned, is heated, either in suspension or in solution, in a high-boiling inert organic liquid such as dichlorobenzene, preferably under alkaline conditons, for instance, in the presence of fused sodium acetate or soda ash, the compound undergoes a peculiar transformation and yields a new chemical compound which is of an entirely different crystalline structure and of a distinctly different chemical nature than the initial material.

The product is characterized by unusual fastness properties. Its fastness to light and to alkali distinguishes it from the initial material, and is found to be even superior to that of monomethyl-mono-isopropyl diether of dihydroxy-dibenzanthrone, described in said copending application, Ser. No. 549,092. Its fastness to acid is particularly remarkable and finds no parallel in any known ether of dihydroxy-dibenzanthrone. Jade Green (dimethoxy-dibenzanthrone) and related compounds hydrolyze when treated with sulfuric acid and give the free dihydroxy-dibenzanthrone. My novel compounds, however, are stable under the highly acid conditions required for sulfonation or nitration.

My novel compounds are also stable in an aluminum chloride melt, and may be subjected to fusion with aluminum chloride (or other metal halide condensing agents) in the presence of aroyl halides serving the purpose of introducing aryl ketonic groups into the dibenzanthrone nucleus.

The mechanism and nature of the above transformation are not clearly understood. Taking all factors into consideration, it would appear that during the heating, the free OH group is eliminated together with one hydrogen atom from the isoalkyl radical, the latter very probably joining bonds with the dibenzanthrone ring to form a pyrane ring. If this theory is correct the reaction probably proceeds along the following lines:

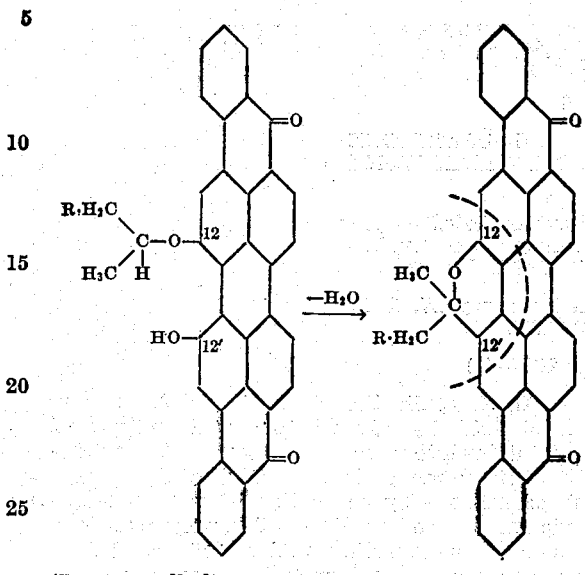

(R=H or alkyl)

The pyrane ring in the product formula has been surrounded for emphasis by a dotted line. It will be understood, however, that I do not wish to limit my invention to any particular theory, but inserted the same here merely to better explain the nature of the observed facts. Of these facts, in addition to those already mentioned, the following are worthy of note.

I have found that the speed of transformation can be considerably accelerated by effecting the heating in the presence of high-boiling, heavy molecular alkylating or aralkylating agents. As examples of such agents the following may be mentioned: ethylene dibromide, dichlorhydrin, monochlorhydrin, diphenyl-dichloro-methane, dibromo-stilbene, benzal chloride, benzaldehyde, fluorenone-dichloride, ω-dibromo-methyl-anthraquinone, and others. It will be noted that each of these agents possesses at least one aliphatic carbon atom which carries an exchangeable ester group (halogen atoms or an oxygen atom), and is potentially capable of forming an ether by neutralizing the free hydroxyl group of the dibenzanthrone compound. Just why these additional agents should behave in this manner is very difficult to explain or to prove. It does seem probable, however, that these agents form a transitory ether with the free OH group of the mono-alkylated dihydroxy-dibenzanthrone, and then split off together with the oxygen atom, and lead to the formation of the pyrane ring. In any event, regardless of theory, I have found that where the heating of mono-isopropyl-dihydroxy-dibenzanthrone in a suitable solvent, say dichlorobenzene, in the presence of fused sodium acetate, but in the absence of the above catalyzers, required about 20 to 30 hours for complete transformation, the addition of a high-boiling, heavy molecular alkylating agent reduced the transformation time to about 2 to 3 hours. In other words, the additional alkylating agent appears to act as a true catalyst in this reaction.

The presence of an alkaline agent such as sodium acetate or carbonate is not essential for transformation. Its function is merely to keep the mono-alkyl ether from decomposing under the influence of the high temperature. In other words, absence of an alkaline medium is not fatal to the reaction, but causes the yield of the product to be low, due to decomposition of the initial material.

The temperature of the transformation may vary within wide limits. It should not be below about 150° C., but above this limit it may vary considerably, depending on the boiling point of the solvent or vehicle selected. Commonly available high boiling solvents usually have a boiling point between 170° and 220° C. It is clear, therefore, that under practical working conditions the temperature will seldom rise above 220° C. However, the same solvents as well as lower boiling solvents may be used under pressure, if desired, in which case the temperature may be allowed to go higher, thereby accelerating the rate of reaction.

The solvent selected should be one capable of dissolving the initial material, mono-isoalkyl-dihydroxy-dibenzanthrone, at the temperature of the reaction and should preferably be anhydrous. In addition to dichlorobenzene, already mentioned, the following have been found very useful: trichlorobenzene, nitrobenzene, molten naphthalene.

As initial material, one may select the free mono-hydroxy-monoisoalkoxy, dibenzanthrone or its alkali-metal salt, such as the sodium salt.

Without limiting my invention to any particular procedure, the following examples, in which parts are given by weight, will serve to illustrate my preferred mode of operation.

PREPARATION OF MY NOVEL COMPOUNDS

*Example 1*

20 parts of the mono-isopropyl ether of dihydroxy-dibenzanthrone and 20 parts of pulverized, fused sodium acetate are suspended in 400 parts of dry dichlorbenzene. The mass is heated under agitation to 175–180° C. and kept at this temperature (gentle reflux) until a "spot" test on filter paper has changed from a deep blue to a bluish green coloration and the initial blue plates or cubes of mono-isopropyl ether, as viewed under the microscope, have given way to long, slender needles. This change will generally come about after some 20 to 30 hours of heating. The reaction product is then filtered off at 100–120° C. and freed from adhering dichlorobenzene and inorganic salts by steam distilling the filter cake free of solvent and isolating the product by filtration.

Alternatively, the original filter cake may be washed free of dichlorobenzene with alcohol, and then alkali free with hot water, and dried. The product thus obtained may be further purified according to the procedures described in Examples 7 and 8.

*Example 2*

The procedure is carried out as in Example 1, except that there are added to the reaction mass prior to heating 5 to 10 parts of benzal-chloride or 10 parts of benzaldehyde. The reaction requires in these cases only 4 to 6 hours heating for completion, the reaction product, however, is substantially identical with the product of Example 1.

*Example 3*

The procedure is the same as in Example 1, except that the heating is carried out in the presence of 5 to 10 parts of a divalent alkylating agent selected from the following group:

Monochlorohydrin
(CH₂—Cl—CH—OH—CH₂—OH)
Dichlorohydrin
(CH₂—Cl—CH—OH—CH₂—Cl) and
Ethylene dibromide (CH₂—Br—CH₂—Br)

The reaction is completed in 6 to 8 hours at gentle reflux. The reaction product is substantially identical with that of Example 1.

Example 4

10 parts of the mono-isopropyl ether of dihydroxy-dibenzanthrone are suspended in 400 parts of dry dichlorobenzene. There are then added 10 parts of pulverized fused sodium acetate, 10 parts of dry soda ash, and 20 parts of p,p'-dibromo-benzo-phenone-dichloride

(Br—C₆H₄—CCl₂—C₆H₄—Br)

The mass is heated under agitation to 175–180° C., allowing a small amount of water to distill off, and kept at gentle reflux for about 4 to 5 hours or until a "spot" test on filter paper gives a bluish green coloration. The reaction product, consisting of well defined long needles, is filtered off at about 150° C. and isolated as per Example 1. It is practically free of organic bound halogen and is substantially identical with the product of Example 1.

As a further modification of this example there may be used diphenyl-dichloro-methane or dibromo-stilbene instead of the dibromo-benzophenone-dichloride. In each case the reaction is complete in 4 to 6 hours and the reaction product appears to be identically the same.

Example 5

10 parts of mono-isopropyl ether of dihydroxy-dibenzanthrone are suspended in 200 parts of trichlorobenzene. There are then added 10 parts of dry soda ash and the mass is agitated at 190–200° C. for about 24 hours or until the reaction is complete as indicated by the bluish-green "spot" test on filter paper. The product is then isolated as in Example 1, and is substantially identical with the product of Example 1, except that it contains a small amount of dihydroxy-dibenzanthrone from which it can be freed by one of the purification methods described in Example 7 and 8.

Example 6

1 part of the mono-isopropyl ether of dihydroxy-dibenzanthrone is dissolved in 20 parts molten naphthalene and the solution is heated to 200–210° C. for 8–10 hours. The mixture is then cooled to about 100° C., and 50 parts of solvent naphtha are added. The precipitate is filtered off, washed with a little alcohol and dried. The major part of the reaction product, thus obtained, consists of dihydroxy-dibenzanthrone. But an appreciable amount of the crude product is soluble in hot trichlorobenzene, and may be recovered by heating the entire mass in this solvent, filtering at about 100–120° C., cooling the filtrate to room temperature, and precipitating out the product by adding an equal volume of alcohol. The reaction product thus isolated is identical with the purified product of Example 1.

PURIFICATION OF THE PRODUCTS OF EXAMPLES 1–5 AND PROPERTIES

Example 7

10 parts of the dry reaction product as obtained in Examples 1 to 5 are dissolved in 200 parts of concentrated sulfuric acid (93%). There are then dropped in slowly, over a period of 2 to 3 hours, 33 parts of water, while keeping the temperature at 50 to 60° C. The mass is then stirred at room temperature for about 15 hours, during which time the sulfate of the novel reaction product crystallizes out in the form of large brownish plates. The mass is then filtered, and the filter cake is washed with about 200 parts of sulfuric acid (78%) and then with cold water until free of acid. By this water washing the sulfate is hydrolyzed to bluish-green crystals with a pronounced metallic luster.

Example 8

10 parts of the dry reaction product as obtained in Examples 1 to 5 are suspended in 1000 parts trichlorobenzene. The mass is heated to about 200° C. and then filtered at this temperature. The filtrate is allowed to cool to room temperature and the precipitate is filtered off, washed with alcohol until free of trichlorobenzene, and dried.

PROPERTIES

The purified product obtained in Example 7 or 8 is a reddish-blue or bluish-green crystalline solid, depending on the size of the particles, and possesses a pronounced metallic luster.

It is practically insoluble in water, alcohol and cold glacial acetic acid or benzene. It is soluble, however, in hot high-boiling organic solvents, such as nitrobenzene, dichlorobenzene, trichlorobenzene, and naphthalene with a deep greenish-blue color in transmitted light, showing a pronounced red fluorescence in reflected light.

It is soluble in concentrated sulfuric acid with a very deep wine-red color, with a blue tint. This coloration changes to an intense deep green by adding a drop of nitric acid to the sulfuric acid solution.

The concentrated sulfuric acid solution of the compound may be heated to about 200° C. without effecting any decomposition or hydrolyzation of the product, as shown by test dyeings on cotton.

The product is readily vatted in warm dilute alkaline hydrosulfite to a bluish-violet vat, in transmitted light, with a pronounced red fluorescence, and appears almost red, unless care is taken to exclude reflected light. Cotton is dyed from this vat in blue shades which change to a bright bluish green, when exposed to air. These dyeings possess excellent fastness properties.

FURTHER EXAMPLES OF PREPARATION

Example 9

10 parts of the mono-isobutyl ether of dihydroxy-dibenzanthrone (obtained by reacting on the soda salt of dihydroxy-dibenzanthrone with isobutylbromide under substantially the same reaction conditions as employed for the corresponding isopropyl derivative in copending application Ser. No. 549,092) and 10 parts of pulverized fused sodium acetate are dissolved in 400 parts dry dichlorobenzene. The mass is then heated under agitation to 175-180° C. and kept at this temperature until a small test portion, isolated from the reaction mass, vatted and dyed on cotton, produces a bluish green shade, fast to acid and alkali. The reaction product is then isolated in the same manner as described in Example 1 for the isopropyl derivative.

The properties of this reaction product in its crude form, and also when purified according to the procedure of Example 7 or 8, are practically the same in every detail as those of the corresponding isopropyl derivative, except that the shade produced in dyeings on cotton is somewhat bluer than the shade produced by the isopropyl derivative.

The starting material in the above examples was the isolated pure mono-isopropyl or mono-isobutyl ether of dihydroxy-dibenzanthrone. It is not necessary, however, to isolate this starting material, but the "transformation reaction" may be combined with the mono-iso-alkylation of dihydroxy-dibenzanthrone. This procedure is illustrated in the following examples.

*Example 10*

50 parts of dry, pulverized soda salt of dihydroxy-dibenzanthrone (prepared by pasting up 34 parts of dihydroxy-dibenzanthrone with 16 parts of soda ash and water to a smooth paste, drying at 100° C. and pulverizing), 20 parts of dry soda ash and 10 parts of pulverized fused sodium acetate are suspended in 250 parts of isopropyl bromide. The charge is heated under agitation in a lead lined autoclave to 120-130° C. and kept at this temperature for 24 hours. The excess of isopropyl bromide is now distilled off and the residue heated further to 150° C. To the dry residue there are now added 1000 parts of dry dichlorobenzene, the mass is stirred for 1 hour at 170-175° C., allowing a small amount of lower boiling liquids (isopropyl bromide and hydrolyzation products thereof) to distill off. The mass is then filtered as hot as possible (about 150-160° C.), to separate the soluble mono-isopropyl ether of dihydroxy-dibenzanthrone from the unchanged insoluble dihydroxy-dibenzanthrone (Na salt) and inorganic salts. To the filtrate are added 10 parts of pulverized fused sodium acetate and the mass is agitated at 175-180° C. for about 30 hours, until the "spot" test on filter paper has changed from a deep blue to a bluish green. The well crystallized reaction product is now filtered off at 100-120° C. and the product is isolated as in Example 1, and may be further purified according to the procedures described.

As a further modification of this invention it should be noted that it is not necessary to remove the alkylation agent which has been employed for the mono-alkylation of dihydroxy-dibenzanthrone. Instead, the "transformation reaction" may be carried out in the presence of the alkylation agent, provided that this "transformation reaction" is accelerated by the addition of a divalent alkylating agent as catalyzer. Under these condidtions it seems that the free OH group of the mono-alkoxy-dibenzanthrone in the greater part of the reaction mass becomes engaged in the "transformation reaction" before it has found an opportunity to be etherified by the excess initial alkylation agent. This modification of the invention is further illustrated by the following example.

*Example 11*

50 parts of dry, pulverized soda salt of dihydroxy-dibenzanthrone, prepared as described in Example 10 and 20 parts of dry soda ash, are suspended in 1000 parts dry dichlorobenzene. There are then added under agitation, 50 parts of the isopropyl ester of para-toluene sulfonic acid and the mass is heated to 140-150° C. and stirred at this temperature for 8-10 hours.

There are now added 20 parts of pulverized anhydrous sodium acetate and 25 parts of p,p'-dichloro-benzophenone-dichloride

$(Cl-C_6H_4-CCl_2-C_6H_4-Cl)$, and the mass is heated to reflux (175-180° C.) for about 3-4 hours, or until the orginally deep blue "spot" test on filter paper has changed to a bluish green coloration. The reaction product is then filtered off at about 120° C. and isolated as described in Example 1. It consists mostly of the acid-stable transformation product identical with the product of Example 1. To a smaller extent, however, there has been formed some di-isopropyl ether of dihydroxy-dibenzanthrone, which may be readily hydrolyzed back to the dihydroxy-dibenzanthrone by dissolving the crude reaction product of this example in concentrated sulfuric acid. The transformation product remains unchanged in this treatment, and may be separated from the dihydroxy-dibenzanthrone and isolated in a high degree of purity by extracting the mass with a high boiling organic solvent at elevated temperature, for instance, hot nitrobenzene.

As a still further modification it should be noted that the mono-alkylation of dihydroxy-dibenzanthrone may be carried out as described in the first paragraph of Example 11, except that only one-half the amount of para-toluene-sulfo-isopropyl ester is used. In this case practically all the alkylating agent is used up in the mono-alkylation step, and the "transformation reaction" may be carried out in the same reaction mass without the addition of a divalent alkylating agent as catalyzer.

In the above examples, instead of the mono-isopropyl ether, the mono ether of dihydroxy-dibenzanthrone and any other alkyl or cyclo-alkyl alcohol may be employed, provided it possesses the grouping:

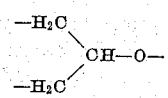

Isoamyl and cyclohexyl are additional examples of such alkyl groups.

Other details such as regarding temperature and time of reaction as well as regards to solvents may be varied without departing from the spirit of the invention.

FURTHER TREATMENT OF THE TRANSFORMATION PRODUCT

The following additional examples will illustrate various modes of operation for converting my novel transformation product into nuclear substitution derivatives thereof, for the purpose of producing novel wool, silk, or cellulose-acetate dyestuffs. Alternatively, my novel compounds may be substituted in the nucleus with neutral substituents, such as halogen or nitro groups, which may vary the shade of the dyestuff slightly, but do not affect its adaptation for use as a vat dyestuff for cotton.

Example 12

30 parts of the product obtained according to any of Examples 1 to 5, and which has been purified according to Example 7 or 8, are stirred into 300 parts 25% oleum, keeping the temperature at 20–25° C. The sulfonation mass is stirred for 1½ hours at 20–30° C. and then poured into 3000 parts of cold water. The precipitate is filtered off; the filter cake is sucked as dry as possible and then charged into a sufficient amount of dilute soda ash solution to obtain finally a neutral paste consisting of the soda salt of the novel sulfo acid, sodium sulfate and water. The green paste thus obtained may be used directly for dyeing wool or silk according to the dyeing procedures employed usually for sulfonated wool or silk colors, or the paste may be dried at 100° C. and pulverized to a green powder. The bright greenish shades obtained with either the paste or the powder on wool and silk show excellent fastness properties, especially toward acids, alkalies and light.

The sulfonation may also be carried out using 600 parts 5% oleum at the same temperature or 150 parts 60% oleum at 5–10° C.

In either case the resulting sulfo acid is apparently equal in shade and general properties to the product obtained with 25% oleum, although the degree of sulfonation may vary with the amount and strength of the oleum and the temperature employed.

The sulfonated product dyes cotton in yellowish green shades from a bluish vat, which, unlike the starting material, does not show any fluorescence.

Example 13

5 parts of the product of Example 7 are dissolved in 100 parts of sulfuric acid (monohydrate). 5 parts of fuming nitric acid (97%) are dropped in very slowly over a period of 2 hours, keeping the temperature at 20–25° C. The solution of the nitro body, thus obtained, which shows a very deep green coloration, is then poured into 1000 parts cold water, the precipitate is filtered off, washed acid free and pasted up with a small amount of water to a smooth paste. The latter dyes cotton from a blue vat in green shades, which upon treatment with bleach change to a gray to black of good fastness properties.

The filter cake as obtained above may be dried at 100° C. The product, which according to the nitrogen analysis, is substantially a mono-nitro compound, may be sulfonated with 25% oleum to a green sulfo acid, which dyes wool and silk in bluish green shades.

Nitration of 5 parts of the same starting material, suspended in 100 parts nitrobenzene with 10 parts of fuming nitric acid (97%) at 80–90° C., furnished a dinitro derivative which dyes cotton in similar shades as the mononitro compound.

Example 14

One-half of the color paste of the mononitro compound, as obtained in Example 13 is vatted at 55–60° C. in 500 parts of water, containing 5 parts of caustic soda and 5 parts of sodium hydrosulfite. The amino body thus obtained is precipitated by air blowing, filtered off, washed alkali free, dried and pulverized to a green powder.

Sulfonation of this material with 25% oleum gives a green sulfo acid which dyes wool and silk in bluish green shades.

Example 15

1 part of the dry amino body as obtained in Example 14 is heated in 10 parts phthalic anhydride to reflux. The melt is then poured into 200 parts of hot water, the precipitate is filtered off, washed with about 100 parts of boiling water, dried and pulverized.

The product thus obtained, which is probably the phthalide of the amino body, dyes cotton from a blue vat in bright yellowish-green shades.

Example 16

5 parts of the product obtained in Example 7 are suspended in 300 parts of trichlorobenzene containing 10 parts of liquid bromine. The mass is heated under agitation slowly over a period of 1 hour to 100° C. The temperature is kept for 1 hour at 100° C. and then raised to 140–150° C. and the mass is stirred until the starting material (bluish cubes) has been transformed completely into uniform small needles as ascertained by microscopic examination. This requires usually about 2 hours heating at 140–150° C. The reaction product is then filtered off at about 100° C. and washed free of solvent with a small amount of alcohol. The product thus obtained contains the theoretical amount of bromine corresponding to a tribromo derivative. It is a bluish green crystalline powder, which dyes cotton, from a blue vat with pronounced red fluorescence, in green shades of excellent fastness properties. Sulfonation of the product with 25% oleum furnishes a green wool and silk dye of somewhat yellower-greenish shades than the unbrominated body.

Example 17

2 parts of the tribromo derivatives as obtained in Example 16 are dissolved in 10 parts of sulfuric acid of 96% strength, at 20–25° C. There are then added at this temperature 2 parts of manganese dioxide and the mass is stirred for 10–12 hours until the well defined reaction product crystallizes out of solution. The mass is now poured into about 200 parts of cold water, containing 5 parts of sodium bisulfite. It is heated to 90–95° C. and the precipitate is filtered off, washed acid free and dried.

The product thus obtained appears to be a monobromo-dihydroxy derivative, and dyes cotton from a blue vat in greenish gray shades, which change with acid to a bluish gray. The product can be methylated with dimethyl-sulfate in nitrobenzene in the presence of soda ash to a blue methyl ether which dyes cotton from a blue vat in greenish-blue shades of good fastness properties.

Example 18

1 part of the tribromo derivative as obtained in Example 16 is refluxed with 20 parts of naphthalene and 1 part of alpha-amino-anthraquinone and a trace of copper powder for 8 to 10 hours. The mass is then cooled to about 100° C. 50 parts of solvent naphtha are added and the reaction product is filtered off and washed with a small amount of alcohol. The condensation product thus obtained dyes cotton from a blue vat in gray shades of good fastness properties.

Example 19

2 parts of the product obtained in Example 7 are stirred into 50 parts sulfuric acid (93%).

There is then added at 15-20° C. 1 part of manganese dioxide and the mass is stirred at 15-20° C. for 14 hours and then poured into 500 parts of cold water containing 5 parts of sodium bisulfite. The mass is heated to 90° C., the reaction product is filtered off, washed acid free and dried. The hydroxy body thus obtained dyes cotton from a blue vat in yellowish green shades, which turn slightly blue with acids. The product may be sulfonated with 25% oleum to a green sulfo acid which dyes wool and silk in much yellower green shades than the sulfonated starting material.

*Example 20*

2 parts of the product obtained in Example 8 are stirred into 10 parts of sulfuric acid (98%), and about 2 parts of chlorine gas are passed into the mass at 20-25° C. within a period of about 1½ hours. The solution is then poured into a large amount of cold water, the chloro derivative is filtered off, washed acid free and dried. The product thus obtained dyes cotton from a blue vat in much yellower green shades than the unchlorinated starting material.

Sulfonation of the product furnishes a wool and silk green of a yellowish green shade.

*Example 21*

1 part of the chloro derivative as obtained in Example 20, and 50 parts of sulfuric acid of 96% strength and 3 parts of boric acid are heated to 170-180° C. for about 1 hour, until the formation of hydrochloric acid gas, which begins to escape from the reaction mass at about 160° C., is practically complete. The mass is then cooled to about 100° C. and poured into a large amount of cold water. The reaction product is filtered off and washed acid free. The hydroxy derivative thus obtained dyes artificial (acetyl) silk in green shades.

*Example 22*

5 parts of the product of Example 8 are charged into a melt consisting of 100 parts antimony trichloride and 50 parts anhydrous aluminum chloride, which has been heated to 110-120° C. The melt is stirred for ½ hour at 110-120° C. and 3 parts of the chloride of alpha-chloro-beta-anthraquinone carboxylic acid are added. The mass is stirred for 2½ hours longer at 130-135° C., and is then poured into 500 parts of 10% hydrochloric acid. The precipitate is filtered off at 80-90° C. The filter cake is washed with 100 parts hot 5% hydrochloric acid and then with hot dilute soda ash solution and finally with water until alkali free.

The product thus obtained is purified by crystallization from sulfuric acid.

According to the chlorine analysis, the product appears to be a ketone involving one molecule of the initial dibenzanthrone derivative and one molecule of alpha-chloro-anthraquinone. It dyes cotton from a blue vat in greenish-blue shades, fast to acid and alkalies.

It will be noted that the compounds produced in Examples 12 to 22, although differing specifically from the products obtainable in Examples 1 to 11, have this one feature in common therewith that they are all dibenzanthrone derivatives containing in their structure the configuration

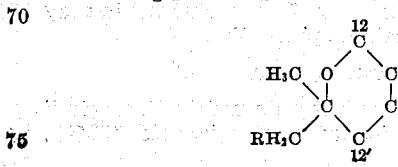

wherein R stands for hydrogen or an alkyl group, and the numerals 12, 12' indicate the positions of the respective carbon atoms in the dibenzanthrone molecule.

In the claims below it should be understood that where I claim a new product, dyestuff or article of manufacture, I mean to include this body not only in substance, but also in whatever state it exists when applied to material dyed, printed, or pigmented therewith.

I claim:

1. A transformation product of a mono-isoalkyl ether of dihydroxy-dibenzanthrone, being substantially identical with the product obtainable by heating a mono-isoalkyl ether of 12, 12' dihydroxy-dibenzanthrone in an inert organic solvent at a temperature between 170° and 220° C., in the presence of an anhydrous alkaline agent.

2. A transformation product of a mono-isoalkyl ether of dihydroxy-dibenzanthrone, being substantially identical with the product obtainable by heating a mono-isoalkyl ether of 12, 12' dihydroxy-dibenzanthrone in an inert organic solvent at a temperature between 170° and 220° C., in the presence of an anhydrous alkaline agent, and purifying the product by recrystallization from sulfuric acid.

3. A dibenzanthrone compound containing in its structure the configuration

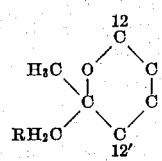

wherein R stand for hydrogen or an alkyl group, and where the numerals 12, 12' indicate the positions of the carbon atoms in the dibenzanthrone nucleus.

4. A dibenzanthrone compound whose nuclear structure corresponds to the following formula:

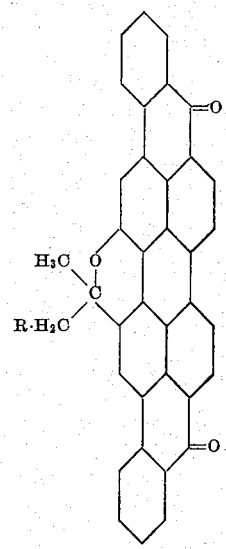

wherein R stands for hydrogen or the methyl group.

5. A transformation product of mono-isopropyl-oxy-monohydroxy-dibenzanthrone, being substantially identical with the product obtainable by heating a mono-isopropyl ether of 12, 12' dihydroxy-dibenzanthrone in an inert organic solvent at a temperature between 170° and 220° C. in the presence of an anhydrous alkaline agent.

6. The sulfonation product obtainable by subjecting to sulfonation the product defined in claim 1.

7. The process of producing a dyestuff compound which comprises heating a mono-isoalkyl ether of 12, 12′ dihydroxy-dibenzanthrone in an inert solvent at a temperature above 150° C. but below that at which the initial material would undergo pyrolysis.

8. The process of producing a dyestuff compound which comprises heating a mono-isoalkyl ether of 12, 12′ dihydroxy-dibenzanthrone in an inert solvent at a temperature between 170 and 220° C.

9. The process of producing a dyestuff compound which comprises heating a mono-isoalkyl ether of 12, 12′ dihydroxy-dibenzanthrone in an inert solvent and in the presence of an alkaline reacting agent, at a temperature between 170 and 220° C.

10. The process of producing a dyestuff compound which comprises heating a mono-isoalkyl ether of 12, 12′ dihydroxy-dibenzanthrone above 150° C., but below the temperature at which it would undergo pyrolysis, in a high boiling inert organic solvent, and in the presence of an anhydrous alkaline agent and a high-boiling, heavy molecular alkylating agent.

11. The process of producing a dyestuff compound which comprises heating a mono-isoalkyl ether of 12, 12′ dihydroxy-dibenzanthrone in an inert solvent in the presence of an alkaline reacting agent, at a temperature between 170 and 220° C., and continuing the heating until a spot test of the reaction mass on filter paper gives a bluish-green coloration.

12. The process of producing a dyestuff compound which comprises heating a mono-isoalkyl ether of 12, 12′ dihydroxy-dibenzanthrone in an inert solvent and in the presence of an alkaline reacting agent, at a temperature between 170 and 220° C., and continuing the heating until the initial mono-isoalkoxy-mono-hydroxy-dibenzanthrone compound has been substantially converted into a product which is stable in hot concentrated sulfuric acid.

13. The process of producing a dyestuff compound which comprises heating a mono-isoalkyl ether of 12, 12′ dihydroxy-dibenzanthrone above 150° C., but below the temperature at which it would undergo pyrolysis, in a high boiling inert organic solvent, and in the presence of an anhydrous alkaline agent and a high-boiling, heavy molecular alkylating agent, and continuing the heating until the initial mono-iosalkoxy-mono-hydroxy-dibenzanthrone compound has been substantially converted into a product which is stable in hot concentrated sulfuric acid.

14. The process of producing a dyestuff compound which comprises heating a mono-isoalkyl ether of 12, 12′ dihydroxy-dibenzanthrone in an inert solvent at a temperature above 150° C., but below that at which the initial material would undergo pyrolysis, and recovering that portion of the reaction product which is stable in hot concentrated sulfuric acid.

15. The process of producing a dyestuff compound which comprises heating a mono-isoalkyl ether of 12, 12′ dihydroxy-dibenzanthrone in an inert solvent and in the presence of an alkaline reacting agent, at a temperature between 170 and 220° C., to transform the initial dibenzanthrone compound into a product which is stable in hot concentrated sulfuric acid, recovering the latter in solid form and subjecting the same to purification by recrystallization from sulfuric acid.

16. The process which comprises heating the mono-isopropyl ether of 12, 12′ dihydroxy-dibenzanthrone in an inert organic solvent at a temperature between 170 and 220° C., in the presence of an anhydrous alkaline agent, to transform the product into a vat dyestuff of the benzanthrone series characterized by high stability in hot concentrated sulfuric acid.

17. The process which comprises heating the mono-isopropyl ether of 12, 12′ dihydroxy-dibenzanthrone in an inert organic solvent at a temperature between 170 and 220° C., in the presence of an anhydrous alkaline agent, and a high-boiling, heavy molecular alkylating agent.

18. The process which comprises heating the mono-isopropyl ether of 12, 12′ dihydroxy-dibenzanthrone in an inert organic solvent at a temperature between 170 and 220° C., in the presence of an anhydrous alkaline agent, and a high-boiling, heavy molecular alkylating agent selected from the group consisting of ethylene dibromide, dichlorhydrin, monochlorhydrin, benzaldehyde, benzal chloride, diaryl-dihalogen methanes, and diaryl-dihalogen-ethane compounds.

19. The process of producing a dyestuff of the dibenzanthrone series, which comprises heating a mono-isoalkyl ether of 12, 12′ dihydroxy-dibenzanthrone in an inert organic solvent at a temperature above 150° C., but below the boiling point of the solvent under the particular pressure employed in the operation, recovering the resulting transformation product, and subjecting the same further to a sulfonation treatment, whereby to adapt the same for the dyeing of animal fiber.

20. The process of producing a dyestuff of the dibenzanthrone series, which comprises heating a mono-isoalkyl ether of 12, 12′ dihydroxy-dibenzanthrone in an inert organic solvent at a temperature above 150° C., but below the boiling point of the solvent under the particular pressure employed in the operation, recovering the resulting transformation product, and subjecting the same further to operations introducing hydroxy groups, whereby to convert the same into a dyestuff for cellulose acetate material.

21. The process of producing a dyestuff of the dibenzanthrone series, which comprises heating a mono-isoalkyl ether of 12, 12′ dihydroxy-dibenzanthrone in an inert organic solvent at a temperature above 150° C., but below the boiling point of the solvent under the particular pressure employed in the operation, recovering the resulting transformation product, and subjecting the same further to aluminum chloride fusion in the presence of an aroyl halide, whereby to introduce aryl-ketonic groups into the dibenzanthrone nucleus.

22. The dyestuff obtainable by the process defined in claim 20.

OTTO STALLMANN.